United States Patent
Kelly et al.

(10) Patent No.: US 10,160,431 B2
(45) Date of Patent: Dec. 25, 2018

(54) CONTROLLING THE DECELERATION OF A VEHICLE

(71) Applicant: Jaguar Land Rover Limited, Whitley, Coventry, Warwickshire (GB)

(72) Inventors: James Kelly, Solihull (GB); David Armstrong, Birmingham (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 84 days.

(21) Appl. No.: 15/506,721

(22) PCT Filed: Jul. 22, 2015

(86) PCT No.: PCT/EP2015/066742
§ 371 (c)(1),
(2) Date: Feb. 24, 2017

(87) PCT Pub. No.: WO2016/030089
PCT Pub. Date: Mar. 3, 2016

(65) Prior Publication Data
US 2018/0222459 A1  Aug. 9, 2018

(30) Foreign Application Priority Data
Aug. 26, 2014 (GB) .................................. 1415046.0

(51) Int. Cl.
*B60W 10/06* (2006.01)
*B60T 8/1761* (2006.01)
(Continued)

(52) U.S. Cl.
CPC .......... *B60T 8/1761* (2013.01); *B60T 8/3275* (2013.01); *B60W 10/06* (2013.01);
(Continued)

(58) Field of Classification Search
None
See application file for complete search history.

(56) References Cited

U.S. PATENT DOCUMENTS

| 5,947,221 A | 9/1999 | Taniguchi et al. |
| 7,914,085 B2 | 3/2011 | Tsunehara |

(Continued)

FOREIGN PATENT DOCUMENTS

| DE | 19838972 A1 | 3/2000 |
| DE | 102011114701 A1 | 4/2012 |

(Continued)

OTHER PUBLICATIONS

Combined Search and Examination Report for application No. GB1415046.0, dated Feb. 25, 2015, 8 pages.
(Continued)

*Primary Examiner* — Richard M Camby
(74) *Attorney, Agent, or Firm* — Reising Ethington P.C.

(57) ABSTRACT

A method of controlling the deceleration of a vehicle to account for an increase in friction in the vehicle brake system as the vehicle decelerates. The method comprises receiving a signal indicative of a value of the speed of the vehicle and a signal indicative of a value of a brake pressure in the vehicle brake system. The method further comprises comparing the vehicle speed value and the brake pressure value to respective thresholds. The method still further comprises increasing the drive torque applied to one or more wheels of the vehicle when the vehicle speed value falls below the threshold to which it was compared and the brake pressure value exceeds the threshold to which it was compared, such that the increased drive torque acts against the braking of the vehicle as the vehicle is decelerated to a stop.

20 Claims, 4 Drawing Sheets

(51) Int. Cl.
*B60W 10/188* (2012.01)
*B60W 30/18* (2012.01)
*B60T 8/32* (2006.01)

(52) U.S. Cl.
CPC .... *B60W 10/188* (2013.01); *B60W 30/18109* (2013.01); *B60T 2230/04* (2013.01); *B60T 2270/303* (2013.01); *B60W 2510/182* (2013.01); *B60W 2520/105* (2013.01); *B60W 2710/105* (2013.01)

(56) References Cited

U.S. PATENT DOCUMENTS

| | | | |
|---|---|---|---|
| 2007/0182243 A1 | 8/2007 | Osborn et al. | |
| 2009/0187324 A1* | 7/2009 | Lu | B60K 31/00 701/94 |
| 2016/0185327 A1* | 6/2016 | Ishida | B60T 7/12 701/74 |

FOREIGN PATENT DOCUMENTS

| | | |
|---|---|---|
| DE | 102013002890 A1 | 8/2014 |
| EP | 2177412 A1 | 4/2010 |
| GB | 2297633 A | 8/1996 |
| JP | S62295762 A | 12/1987 |

OTHER PUBLICATIONS

International Search Report for International application No. PCT/EP2015/066742, dated Oct. 9, 2015, 7 pages.
Written Opinion for International application No. PCT/EP2015/066742, dated Oct. 9, 2015, 6 pages.

* cited by examiner

CONTROLLING THE DECELERATION OF A VEHICLE

TECHNICAL FIELD

The present invention relates to automatic speed control of a vehicle and particularly, but not exclusively, to automatically controlling the deceleration of a vehicle to account for an increase in friction in the vehicle braking system as the vehicle decelerates. Aspects of the invention relate to a method, to a non-transitory computer-readable storage medium, to a system, to a vehicle, and to an electronic controller.

BACKGROUND

As a vehicle decelerates to a stop, the friction in the braking system (e.g., between the brake pads and discs) increases as the brake pressure applied to the wheels of the vehicle increases, and thus, the speed of the vehicle decreases. It has been identified that in addition, due to the dynamic characteristics of the forces acting within the brake disc/brake pad arrangement, as the vehicle slows down, at low speeds, and particularly at lower braking pressures the braking effect increases sharply shortly before the vehicle comes to a standstill. As this happens, the friction in the brakes will become sufficient to terminate rotation of the brake pads (and hence the wheels) at a time when the vehicle still has some, albeit limited, forward movement (i.e., there becomes a point at which the brake pad "grabs" the brake disc prior to the vehicle being at a complete standstill). The extent to which this will occur, and the speed and pressures at which it will occur, will be a characteristic of the brake system and will be dependent upon factors including, for example, brake disc and pad materials, sizes, and vehicle mass.

For a vehicle being decelerated to a stop whilst traversing a deformable, low-mu surface, such as, for example, sand, gravel, mud, or wet grass, the effect of the disc "grabbing" the pad and terminating wheel rotation may cause the wheels of the vehicle to skid a short distance and dig into the material forming the surface (e.g., sand, gravel, mud, etc.) as the vehicle comes to a standstill because the surface cannot withstand the friction between the wheels and the surface material required to stop the vehicle. As a result, the material forming the surface (e.g., sand, mud, gravel, etc.) may build up in front of the vehicle wheels, making it more difficult to subsequently pull away in a composed manner (i.e., because the vehicle must overcome the build-up of material before progressing in a desired manner).

Similarly, when a vehicle is being decelerated to a stop whilst traveling a high-mu surface (e.g., pavement), and both the brake pressure and speed are below certain particular amounts, the friction in the brake system in the final portion of a braking event may result in the vehicle coming to an abrupt stop without skidding (i.e., the friction increases to a point at which the pads "grab" the disc). In other words, rather that the vehicle speed gradually reducing to zero, it will reduce to a particular speed and then the friction in the braking system, combined with the high friction between the wheels and the high-mu surface, will cause the vehicle to abruptly stop. As such, rather than slowing to a stop in a smooth, composed manner, the front end of the vehicle may dip or dive downward relative to the back end of the vehicle, resulting in the stopping of the vehicle in an abrupt, uncomposed manner that may be uncomfortable to the passengers in the vehicle.

Accordingly, it is an aim of the present invention to address, for example, the disadvantages identified above.

SUMMARY OF THE INVENTION

According to one aspect of the invention, there is provided a method of controlling the deceleration of a vehicle to account for an increase in friction in the vehicle brake system as the vehicle decelerates. In an embodiment, the method comprises: receiving a signal indicative of a value of the speed of the vehicle and a signal indicative of a value of a brake pressure in the vehicle brake system; comparing the vehicle speed value and the brake pressure value to respective thresholds; and when the vehicle speed value falls below the threshold to which it was compared and the brake pressure value exceeds the threshold to which it was compared, increasing the drive torque applied to one or more wheels of the vehicle such that the increased drive torque acts against the braking of the vehicle as the vehicle is decelerated to a stop.

According to another aspect of the invention, there is a provided a system for controlling the deceleration of a vehicle to account for an increase in friction in the vehicle brake system as the vehicle decelerates. In an embodiment, the system comprises: means for receiving a signal indicative of a value of the speed of the vehicle and a signal indicative of a value of a brake pressure in the vehicle brake system; and means to compare automatically the vehicle speed value and brake pressure value to respective thresholds, and when the vehicle speed value falls below the threshold to which it was compared and the brake pressure value exceeds the threshold to which it was compared, command the increase in the drive torque applied to one or more wheels of the vehicle such that the increased drive torque acts against the braking of the vehicle as the vehicle is decelerated to a stop. In an embodiment, the system comprises an electronic processor having an electrical input for receiving the signals indicative of the vehicle speed and brake pressure values; and an electronic memory device electrically coupled to the electronic processor and having instructions stored therein, wherein the processor is configured to access the memory device and execute the instructions stored therein such that it is operable to: compare the vehicle speed value and brake pressure value to respective thresholds, and when the vehicle speed value falls below the threshold to which it was compared and the brake pressure value exceeds the threshold to which it was compared, command the increase in the drive torque applied to one or more wheels of the vehicle such that the increased drive torque acts against the braking of the vehicle as the vehicle is decelerated to a stop.

According to a still further aspect of the invention, there is provided an electronic controller for a vehicle having a storage medium associated therewith storing instructions that when executed by the controller cause the automatic speed control of a vehicle in accordance with the method of: receiving a signal indicative of a value of the speed of the vehicle and a signal indicative of a value of a brake pressure in the vehicle brake system; comparing each of the vehicle speed and brake pressure values to a respective threshold; and when the vehicle speed value falls below the threshold to which it was compared and the brake pressure value exceeds the threshold to which it was compared, increasing the drive torque applied to one or more wheels of the vehicle such that the increased drive torque acts against the braking of the vehicle as the vehicle is decelerated to a stop.

According to yet another aspect of the invention there is provided a vehicle comprising the system described herein.

According to a further aspect of the invention, there is provided a non-transitory, computer-readable storage medium storing instructions thereon that when executed by one or more electronic processors causes the one or more processors to carry out the method described herein.

Optional features of the various aspects of the invention are set out below in the dependent claims.

Embodiments of the present invention have the advantage that in an instance wherein a vehicle that is traversing, for example, a deformable, low-mu surface (e.g., sand, gravel, wet grass, or mud) is decelerated to a stop, the braking of the vehicle acts against the increased drive torque applied to the vehicle wheels. This prevents, or at least limits, the amount of surface material that builds up in front of the wheels as a result of an increase in friction in the braking system as the vehicle comes to a stop, and therefore, makes it easier for the vehicle to subsequently pull away. Similarly, in an instance wherein a vehicle that is traversing a solid, high-mu surface (e.g., pavement) is decelerated to a stop, the braking of the vehicle against an increased drive torque applied to the vehicle wheels may result in a more consistent level of braking, which may give the occupants of the vehicle a reliable, chauffeur stop level of comfort that is independent of the driver's particular braking style, i.e., the vehicle will decelerate continuously to a standstill rather than decelerating to close to a standstill and then abruptly stopping.

Within the scope of this application it is expressly intended that the various aspects, embodiments, examples, and alternatives set out in the preceding paragraphs, in the claims, and/or in the following description and drawings, and in particular the individual features thereof, may be taken independently or in any combination. Features described in connection with an embodiment are applicable to all embodiments, unless such feature(s) is/are incompatible.

BRIEF DESCRIPTION OF THE DRAWINGS

One or more embodiments of the invention will now be described, by way of example only, with reference to the following figures in which.

DETAILED DESCRIPTION

The system and method described herein may be used to automatically control the deceleration of a vehicle to account for an increase in friction in the vehicle braking system as the vehicle decelerates. In an embodiment, the present system and method receive a signal indicative of a value of the speed of the vehicle and a signal indicative of a value of a brake pressure in the vehicle brake system, compare each of the values to a respective threshold, and when both values fall below the thresholds to which they were compared, command an increase in the drive torque applied to one or more wheels of the vehicle such that the increased drive torque acts against the braking of the vehicle as the vehicle decelerates to a stop or standstill.

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function blocks is made for ease of explanation of the manner of operation of a control system according to an embodiment of the present invention.

Figure 1:
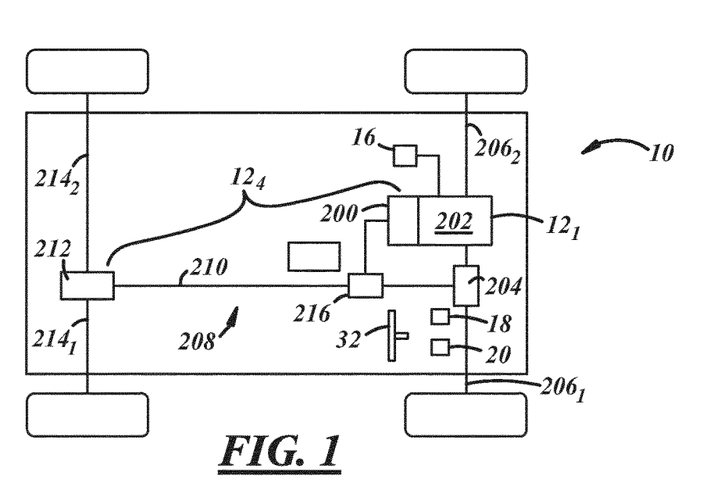
FIG. 1 is a schematic and block diagram of a vehicle.
Figure 2:
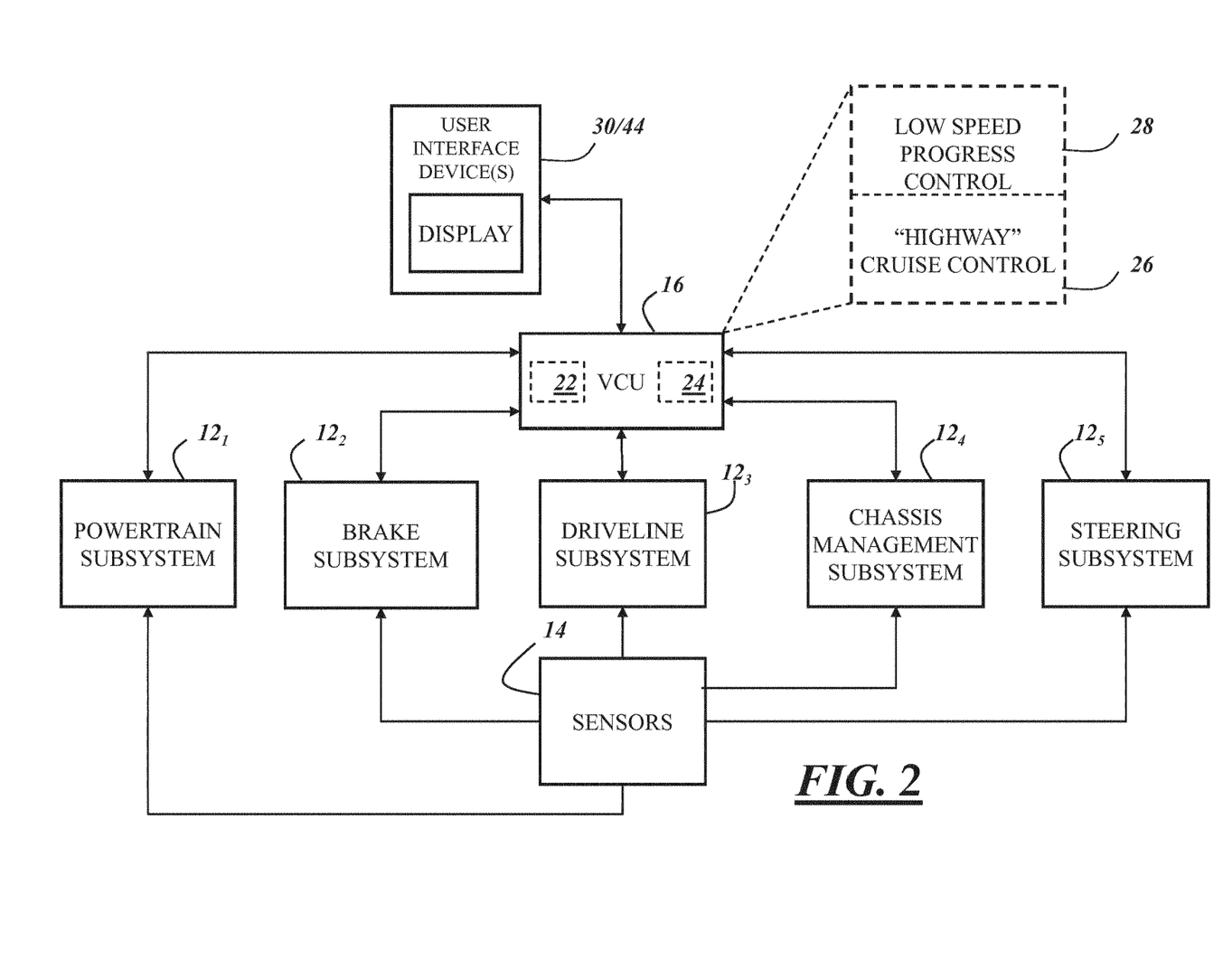
FIG. 2 is another block diagram of the vehicle illustrated in FIG. 1.

With reference to FIGS. 1 and 2, there are shown some of the components of a vehicle 10 with which the present system and method may be used. Although the following description is provided in the context of the particular vehicle illustrated in FIGS. 1 and 2, it will be appreciated that this vehicle is merely an example and that other vehicles may certainly be used instead. For instance, in various embodiments, the method and system described herein may be used with any type of vehicle having an automatic, manual, or continuously variable transmission, including traditional vehicles, hybrid electric vehicles (HEVs), extended-range electric vehicles (EREVs), battery electrical vehicles (BEVs), passenger cars, sports utility vehicles (SUVs), cross-over vehicles, and trucks, to cite a few possibilities. According to an embodiment, vehicle 10 generally includes a plurality of vehicle systems or subsystems 12, a plurality of vehicle sensors 14, and a vehicle control means in the form of an electronic controller 16 (which, in a non-limiting embodiment such as that described below, comprises a vehicle control unit (VCU) (i.e., VCU 16)), among any number of other components, systems, and/or devices that may or may not be illustrated or otherwise described herein.

Subsystems 12 of vehicle 10 may be configured to perform or control various functions and operations relating to the vehicle and, as illustrated in FIG. 2, may include any number of subsystems, for example, a powertrain subsystem $12_1$, a brake subsystem $12_2$, and a driveline subsystem $12_3$.

As is well known in the art, powertrain subsystem $12_1$ is configured to generate power or torque (also referred to below as "drive torque") that is used to propel the vehicle. The amount of torque generated by the powertrain subsystem may be adjusted so as to control the speed of the vehicle (e.g., to increase the speed of vehicle 10, the torque output is increased). The amount of torque that a powertrain subsystem is capable of outputting is dependent upon the particular type or design of the subsystem, as different powertrain subsystems have different maximum output torque capacities. In an embodiment, however, the maximum output capacity of powertrain subsystem $12_1$ of vehicle 10 may be in the order of 600 Nm. As is known in the art, powertrain output torque may be measured using one or more of vehicle sensors 14 described below (e.g., an engine torque sensor, a driveline torque sensor, etc.) or other suitable sensing means, and may be used for a variety of purposes by one or more components, modules, or subsystems of vehicle 10 in addition to powertrain subsystem $12_1$, including, for example and without limitation, one or more of those described below. Those having ordinary skill in the art will appreciate that powertrain subsystem $12_1$ may be provided according to any number of different embodiments, may be connected in any number of different configurations, and may include any number of different components, such as, for example, output torque sensors, electronic control units, and/or any other suitable components known in the art. For instance, in an embodiment, powertrain subsystem $12_1$ may include one or more electric machines, for example, one or more electric machines operable as electrical generators, that are configured to apply retarding torque and/or drive torque to a portion of the powertrain subsystem and/or one or more wheels of the vehicle so as to cause the vehicle to decelerate with or without the use of the brake subsystem (e.g., frictional braking) or to propel the vehicle, respectively. Accordingly, the present invention is not limited to any one particular powertrain subsystem.

Brake subsystem $12_2$ is configured to generate brake torque (also referred to as "negative torque") that is used to slow the vehicle. The application of a sufficient amount of brake torque to the wheel(s) of vehicle 10 results in the slowing down and/or stopping of the progress of vehicle 10. Brake subsystem $12_2$ may take any number of forms known in the art, including, but certainly not limited to, one or a combination of electro-hydraulic, electro-mechanical, regenerative, and brake-by-wire systems.

In an embodiment, brake subsystem $12_2$ is a hydraulic-based brake system. As will be appreciated by one having ordinary skill in the art, the brake subsystem $12_2$ may include a brake pedal (pedal 18 shown in FIG. 1), an actuating rod, a master cylinder assembly, one or more brake or hydraulic lines, and one or more brake caliper assemblies (e.g., one for each wheel of vehicle 10), which, in turn, may include, for example, one or more caliper pistons, brake pads, and a brake disc (also called a rotor) that is coupled to an axle of vehicle 10. The operation of such a system is well known; however, for purposes of illustration, a brief summary will be provided. When pedal 18 is pressed to initiate a braking event, the actuating rod, which is coupled to pedal 18, applies a force onto a piston in the master cylinder that, in turn, causes fluid from a brake fluid reservoir to flow into the master cylinder. This results in an increase in fluid pressure in the brake system (i.e., also referred to as "brake pressure") and results in brake or hydraulic fluid being forced through the hydraulic lines toward one or more of the caliper assemblies. When the fluid reaches a caliper assembly, the piston(s) thereof apply a force to the brake pad and pushes the pad against the brake disc. Friction between the pad and the brake disc results in the generation of a brake torque that is applied to the axle to which the brake disc is coupled, thereby causing the vehicle to decelerate. In any event, it will be appreciated that while a description of one particular example of a brake subsystem has been provided, the present invention is not intended to be limited to any one particular type of brake subsystem.

As will be described in greater detail below, in an embodiment, though certainly not the only embodiment, brake subsystem $12_2$ may further include a controller or electronic control unit (ECU) that is configured and operable to perform, or to contribute to the performance of, various functions. For example, in an embodiment, brake subsystem $12_2$ may include a dedicated brake controller (commonly referred to as an anti-lock brake system (ABS) controller) that is able to individually and separately control the brake torque applied to each wheel of vehicle 10, as well as to perform or control the performance of some or all of the steps of the methodology described below. Alternatively, some or all of this functionality may be performed by one or more other components of vehicle 10 in conjunction with brake subsystem $12_2$.

As illustrated in FIG. 1, driveline subsystem $12_3$ may include a multi-ratio transmission or gearbox 200 that is mechanically coupled with an output shaft of a propulsion mechanism of powertrain subsystem $12_1$ (e.g., an engine or electric motor of powertrain subsystem $12_1$, which is identified as reference number 202 in FIG. 1). Transmission 200 is arranged to drive the front wheels of vehicle 10 by means of a front differential 204 and a pair of front drive shafts $206_1$, $206_2$. In the illustrated embodiment, driveline subsystem $12_3$ also comprises an auxiliary driveline portion 208 arranged to drive the rear wheels of vehicle 10 by means of an auxiliary driveshaft or prop-shaft 210, a rear differential 212, and a pair of rear drive shafts $214_1$, $214_2$. In various embodiments, driveline subsystem $12_3$ may be arranged to drive only the front wheels or the rear wheels, or selectable two wheel drive/four wheel drive vehicles. In an embodiment such as that illustrated in FIG. 1, transmission 200 is releasably connectable to the auxiliary driveline portion 208 by means of a transfer case or power transfer unit 216, allowing selectable two wheel drive or four wheel drive operation. In certain instances, and as is well known in the art, transfer unit 216 may be configured to operate in either a high range (HI) or low range (LO) gear ratio, which may be adjustable by driveline subsystem $12_3$ itself and/or by another component of vehicle 10, such as, for example, VCU 16. Those having ordinary skill in the art will appreciate that driveline subsystem $12_3$ may be provided according to any number of different embodiments, implementations, or configurations, may be connected in any number of different configurations, and may include any number of different components, like sensors (e.g., HI/LO ratio sensor, transmission gear ratio sensors, etc.), control units, and/or any other suitable components known in the art. Accordingly, the present invention is not intended to be limited to any one particular driveline subsystem.

In addition to those subsystems described above, vehicle 10 may further comprise any number of other or additional subsystems. For example, and as illustrated in FIG. 2, vehicle 10 may include a chassis management or control subsystem $12_4$ and/or a steering subsystem $12_5$, to cite a few possibilities. For the purposes of this invention, each of the aforementioned subsystems 12 and the functionality corresponding thereto is conventional in the art. As such, detailed descriptions will not be provided; rather, the structure and function of each identified subsystem 12 will be readily apparent to those having ordinary skill in the art.

In an embodiment, one or more of subsystems 12 may be under at least a certain degree of control by VCU 16 (a detailed description of which will be provided below). In such an embodiment, those subsystems 12 are electrically coupled to, and configured for communication with, VCU 16 to provide feedback to VCU 16 relating to operational or operating parameters of the vehicle, as well as to receive instructions or commands from VCU 16. Taking powertrain subsystem $12_1$ as an example, powertrain subsystem $12_1$ may be configured to gather various types of information relating to certain vehicle operating parameters, such as, for example, torque output, engine or motor speed, etc., and to communicate that information to VCU 16. This information may be gathered from, for example, one or more of vehicle sensors 14 described below. Powertrain subsystem $12_1$ may also receive commands from VCU 16 to adjust certain operating parameters when, for example, a change in conditions dictates such a change (e.g., when a change in vehicle speed has been requested via a brake pedal (pedal 18 in FIG. 1) or an accelerator pedal (pedal 20 in FIG. 1) of vehicle 10). While the description above has been with particular reference to powertrain subsystem $12_1$, it will be appreciated that the same principle applies to each such other subsystem 12 that is configured to exchange information/commands with VCU 16 or directly with one another.

In an embodiment, each subsystem 12 may include a dedicated control means in the form of one or more controllers (e.g., one or more electronic control units (ECUs)) configured to receive and execute instructions or commands provided by VCU 16, and/or to perform or control certain functionality independent from VCU 16. In such an embodiment, each controller may comprise any suitable ECU, and may include any variety of electronic processing devices, memory devices, input/output (I/O) devices, and/or other known components, and perform various control and/or communication related functions. In an embodiment, each controller may include an electronic memory device that may store various information, sensor readings (e.g., such as those generated by vehicle sensors 14), look-up tables, profiles, or other data structures (e.g., such as those used in the performance of the method described below), algorithms (e.g., the algorithms embodied in the method described below), etc. The memory device may comprise a carrier medium carrying a computer-readable code for controlling one or more components of vehicle 10 to carry out the method(s) described below. Each controller may also include one or more electronic processing devices (e.g., a microprocessor, a microcontroller, an application specific integrated circuit (ASIC), etc.) that executes instructions for software, firmware, programs, algorithms, scripts, applications, etc. that are stored in the corresponding memory device and may govern the methods described herein. Each controller may also be electronically connected to other vehicle devices, modules, subsystems, and components (e.g., sensors) via suitable vehicle communications and can interact with them when or as required.

Alternatively, two or more subsystems 12 may share a single controller, or one or more subsystems 12 may be directly controlled by the VCU 16 itself. In an embodiment wherein a subsystem 12 communicates with VCU 16 and/or other subsystems 12, such communication may be facilitated via any suitable wired or wireless connection, such as, for example, a controller area network (CAN) bus, a system management bus (SMBus), a proprietary communication link, or through some other arrangement known in the art. For purposes of this disclosure, and notwithstanding the above, it is to be understood that the controller(s) or ECU(s) described herein may each comprise a control unit or computational device having one or more electronic processors. Vehicle 10 and/or a subsystem 12 thereof may comprise a single control unit or electronic controller or alternatively different functions of the controller(s) may be embodied in, or hosted in, different control units or controllers. As used herein, the term "control unit" will be understood to include both a single control unit or controller and a plurality of control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, may be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

It will be appreciated that the foregoing represents only some of the possibilities with respect to the particular subsystems of vehicle 10 that may be included, as well as the arrangement of those subsystems with VCU 16. Accordingly, it will be further appreciated that embodiments of vehicle 10 including other or additional subsystems and subsystem/VCU arrangements remain within the spirit and scope of the present invention.

Vehicle sensors 14 may comprise any number of different sensors, components, devices, modules, systems, etc. In an embodiment, some or all of sensors 14 may provide subsystems 12 and/or VCU 16 with information or input that can be used by the present method, and as such, may be electrically coupled (e.g., via wire(s) or wirelessly) to, and configured for communication with, VCU 16, one or more subsystems 12, or some other suitable device of vehicle 10. Sensors 14 may be configured to monitor, sense, detect, measure, or otherwise determine a variety of parameters relating to vehicle 10 and the operation and configuration thereof, and may include, for example and without limitation, any one or more of: wheel speed sensor(s); ambient temperature sensor(s); atmospheric pressure sensor(s); tyre pressure sensor(s); gyro sensor(s) to detect yaw, roll, and pitch of the vehicle; vehicle speed sensor(s); longitudinal acceleration sensor(s); engine torque sensor(s); driveline torque sensor(s); throttle valve sensor(s); steering angle sensor(s); steering wheel speed sensor(s); gradient sensor(s); lateral acceleration sensor(s); brake pedal position sensor(s); brake pedal pressure sensor(s); brake pressure sensor(s); accelerator pedal position sensor(s); air suspension sensor(s) (i.e., ride height sensors); wheel position sensor(s); wheel articulation sensor(s); vehicle body vibration sensor(s); water detection sensor(s) (for both proximity and depth of wading events); transfer case HI-LO ratio sensor(s); air intake path sensor(s); vehicle occupancy sensor(s); and longitudinal, lateral, and vertical motion sensor(s), among others known in the art.

The sensors identified above, as well as any other sensors not specifically identified above but that may provide information that can be used by the present method, may be embodied in hardware, software, firmware, or some combination thereof. Sensors 14 may directly sense or measure the conditions for which they are provided, or they may indirectly evaluate such conditions based on information provided by other sensors, components, devices, modules, systems, etc. Further, these sensors may be directly coupled to VCU 16 and/or to one or more of vehicle subsystems 12, indirectly coupled thereto via other electronic devices, vehicle communications bus, network, etc., or coupled in accordance with some other arrangement known in the art. Some or all of these sensors may be integrated within one or more of the vehicle subsystems 12 identified above, may be standalone components, or may be provided in accordance with some other arrangement. Finally, it is possible for any of the various sensor readings used in the present method to be provided by some other component, module, device, subsystem, etc. of vehicle 10 instead of being directly provided by an actual sensor element. For example, VCU 16 or a subsystem 12 may receive certain information from the ECU of a (another) subsystem 12 rather than directly from a sensor 14. It should be appreciated that the foregoing scenarios represent only some of the possibilities, as vehicle 10 is not limited to any particular sensor(s) or sensor arrangement(s); rather any suitable embodiment may be used.

In an embodiment, VCU 16 may comprise any suitable ECU, and may include any variety of electronic processing devices, memory devices, input/output (I/O) devices, and/or other known components, and perform various control and/or communication related functions. In an embodiment, VCU 16 includes an electronic memory device 22 that may store various information, sensor readings (e.g., such as those generated by vehicle sensors 14), look-up tables or other data structures (e.g., such as those used in the performance of the method described below), algorithms (e.g., the algorithms embodied in the method described below), etc. Memory device 22 may comprise a carrier medium carrying a computer-readable code for controlling one or more components of vehicle 10 to carry out the method(s) described below. Memory device 22 may also store pertinent characteristics and background information pertaining to vehicle 10 and subsystems 12. VCU 16 may also include one or more electronic processing devices 24 (e.g., a microprocessor, a microcontroller, an application specific integrated circuit (ASIC), etc.) that executes instructions for software, firmware, programs, algorithms, scripts, applications, etc. that are stored in memory device 22 and may govern the methods described herein. As described above, VCU 16 may be electronically connected to other vehicle devices, modules, subsystems, and components (e.g., sensors) via suitable vehicle communications and can interact with them when or as required. In addition to the functionality that may be performed by VCU 16 described elsewhere herein, in an embodiment, VCU 16 may also be responsible for various functionality described above with respect to subsystems 12, especially when those subsystems are not also configured to do so. These are, of course, only some of the possible arrangements, functions, and capabilities of VCU 16, as other embodiments, implementations, or configurations could also be used. Depending on the particular embodiment, VCU 16 may be a stand-alone vehicle electronic module, may be incorporated or included within another vehicle electronic module (e.g., in one or more of the subsystems 12 identified above), or may be otherwise arranged and configured in a manner known in the art. Accordingly, VCU 16 is not limited to any one particular embodiment or arrangement.

In addition to the components and systems described above, in an embodiment, vehicle 10 may further comprise one or more automatic vehicle speed control systems. For example and with continued reference to FIG. 2, in an embodiment, vehicle 10 may further comprise a cruise control system 26, also referred to as an "on-highway" or "on-road" cruise control system, and a low-speed progress (LSP) control system 28, which may be referred to an "off-highway" or "off-road" progress control system.

On-highway cruise control system 26, which may comprise any number of conventional cruise control systems known in the art, is operable to automatically maintain vehicle speed at a desired "set-speed" set by the user. Such systems are generally limited in their use in that the vehicle must be traveling above a certain minimum threshold speed (e.g., 30 mph (approximately 50 kph)) for the system to be operable. As such, these systems are particularly suited for use in highway driving, or at least driving wherein there is not a lot of repeated starting and stopping, and that permits the vehicle to travel at a relatively high speed. As is known in the art, on-highway cruise control system 26 may include a dedicated or standalone ECU configured to execute and perform the functionality of the system, or alternatively, the functionality of cruise control system 26 may be integrated into another subsystem 12 of vehicle 10 (e.g., powertrain subsystem $12_1$), or for example, VCU 16 (as is illustrated in FIG. 2).

Figure 3:
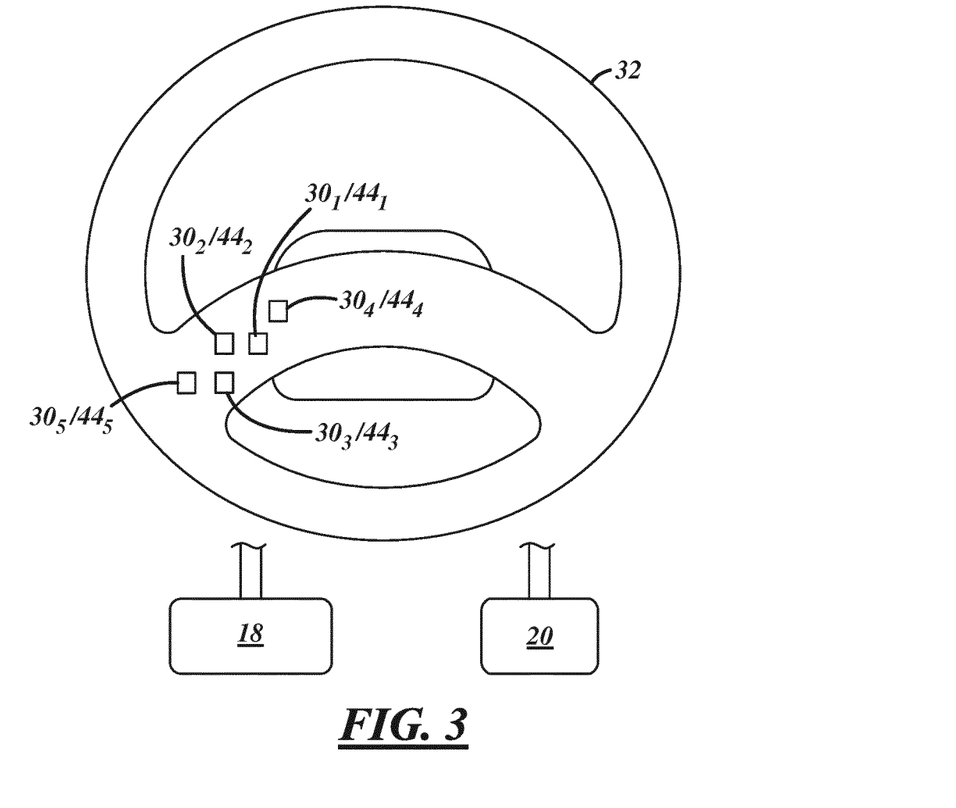
FIG. 3 is a diagram of a steering wheel for use with a vehicle, such as the vehicle illustrated in FIGS. 1 and 2.

Further, and as is known in the art, cruise control system 26 may include one or more user interface devices 30 that may be used by the user (e.g., driver) to interact with system 26 (e.g., the ECU thereof), and in certain embodiments, that allow the system to interact with the user. For example, these devices may allow a user to activate/deactivate system 26 and set and/or adjust the set-speed of the system, to cite a few possibilities. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, center console, etc.). For instance, and with reference FIG. 3, the steering wheel of vehicle 10 (i.e., steering wheel 32 in FIG. 1) may be configured with a plurality user interface devices of cruise control system 26 in the form of pushbuttons. One such device may be a "set speed" button $30_1$ that when manipulated in a particular manner may activate the operation of cruise control system 26 and also set the desired set-speed. Cruise control system 26 may further comprise one or more other user-selectable interface devices (e.g., buttons) to allow the user to increase or decrease the set-speed of the system. For example, a "+" button $30_2$ may be provided to allow the user to increase the set-speed in discrete increments (e.g., 1 mph (or 1 kph)), and a "−" button $30_3$ to allow the user to decrease the set-speed in the same or different discrete increments. Alternatively, the "+" and "−" buttons $30_2$, $30_3$ may be integrated into a single user-selectable device. Additional user-selectable interface devices of system 26 may include, for example, a "cancel" button $30_4$ to deactivate the system, as well as a "resume" button $30_5$ to allow for the system to be re-activated following a temporary suspension of the system function, for example standard cruise control system go into a standby state where they do not control vehicle speed if the user brakes as detailed further below.

It should be appreciated that the foregoing scenarios represent only some of the possibilities of cruise control system 26 and the user interface devices thereof, as vehicle 10 is not limited to any particular cruise control system or user interface device or arrangement; rather, any suitable embodiments may be used.

LSP control system 28 provides a speed control system that enables, for example, the user of a vehicle equipped with such a system to select a very low target speed or set-speed at which the vehicle can progress without, for example, any pedal inputs being required by the user. This low-speed progress control function differs from that of cruise control system 26 in that unlike cruise control system 26, the vehicle need not be traveling at relatively high speeds (e.g., 30 mph (approximately 50 kph)) for the system to be operable (although system 28 may be configured to facilitate automated speed control at speeds from rest to around 30 mph (approximately 50 kph) or more, and therefore, is not limited to "low speed" operation). Furthermore, known on-highway cruise control systems are configured so that in the event the user presses or depresses the brake or the clutch pedals, for example, the on-road cruise control function is suspended and the vehicle reverts to a manual mode of operation requiring user pedal input to maintain vehicle speed and a dedicated operator input (e.g., a "resume" button) is needed to reactivate the cruise control in an active mode in which it controls vehicle speed. In addition, in at least certain cruise control systems, the detection of a wheel slip event, which may be initiated by a loss of traction, may also have the effect of cancelling the cruise control function. LSP control system 28 may also differ from such cruise control systems in that, in at least an embodiment, it is configured in such a way that the speed control function provided thereby may not be cancelled or deactivated in response to those events described above. In an embodiment, LSP control system 28 is particularly suited for use in off-road or off-highway driving.

In an embodiment, LSP control system 28 includes, among potentially other components, a control means in the form of a controller 42, which, in an embodiment such as that described below, comprises an ECU (i.e., ECU 42) (shown, in the illustrated embodiment and for reasons described below, as comprising VCU 16), and one or more user input devices 44. ECU 42 may include any variety of electronic processing devices, memory or storage devices, input/output (I/O) devices, and any other known components, and may perform any number of functions of LSP control system 28, including those described below and embodied in the present method. To that end, ECU 42 may be configured to receive information from a variety of sources (e.g., vehicle sensors 14, vehicle subsystems 12, user input devices 44) and to evaluate, analyze, and/or process that information in an effort to control or monitor one or more operational aspects of vehicle 10, such as, for example: detecting brake and brake release commands initiated by a user or vehicle occupant; automatically commanding and controlling a drive torque generated by the powertrain subsystem $12_1$ and/or a retarding torque generated and applied to one or more wheels of vehicle 10 by, for example, brake subsystem $12_3$; determining the type and/or one or more characteristics of the terrain over which vehicle 10 is traveling; etc. Further, in an embodiment, ECU 42 is configured to carry out or perform one or more steps of the present method described in greater detail below. It should be appreciated that ECU 42 may be a standalone electronic module or may be integrated or incorporated into either another subsystem 12 of vehicle 10 or, for example, VCU 16. For purposes of illustration and clarity, the description below will be with respect to an embodiment wherein the functionality of ECU 42 is integrated or incorporated into VCU 16, such that, as illustrated in FIG. 2, VCU 16 comprises the ECU of LSP control system 28. Accordingly, in such an embodiment, VCU 16, and a memory device thereof or accessible thereby (e.g., memory device 22), in particular, stores various information, data (e.g., predefined set-speeds), sensor readings, look-up tables or other data structures, algorithms, software, acceleration/deceleration profile(s), and the like, required for performing the functionality of LSP control system 28, including that embodied in the method described below.

As with on-highway cruise control system 26 described above, LSP control system 28 further comprises one or more user interface devices 44 that may be used by a user to interact with the system 28, and in certain embodiments, to allow the system 28 to interact with the user. These devices may allow the user to, for example, activate/deactivate LSP control system 28, set and/or adjust the set-speed of the system, select a desired set-speed from a plurality of predefined set-speeds, switch between two or more predefined set-speeds, identify the particular type of terrain vehicle 10 is traversing, and otherwise interact with system 28 as may be described below. These user interface devices may also allow for system 28 to provide certain notifications, alerts, messages, requests, etc. to the user including, but not limited to, those described herein below. Each of these devices may take any number of forms, such as, for example and without limitation, one or more of: a pushbutton; a switch; a touch screen; a visual display; a speaker; a heads-up display; a keypad; a keyboard; a selector knob or dial; or any other suitable device. Additionally, these devices may be located at any number of locations within the vehicle cabin and in relatively close proximity to the user (e.g., steering wheel, steering column, dashboard, etc.). In an embodiment, user interface devices 30, 44 of on-highway cruise control system 26 and LSP control system 28, respectively, are arranged adjacent to one another within vehicle 10, and, in an embodiment, on steering wheel 32 of vehicle 10. However, in other embodiments, such as, for example, that described herein, on-highway cruise control system 26 and LSP control system 28 may share some or all of the same user interface devices. In such an embodiment, an additional user-selectable device, such as a switch, pushbutton, or any other suitable device may be provided to switch between the two speed control systems. Accordingly, in the embodiment illustrated in FIG. 3, those user interface devices $30_1$-$30_5$ described above with respect to cruise control system 26 may also be used in the operation of LSP control system 28, and as such, may also be referred to as user interface devices $44_1$-$44_5$ when discussed in the context of system 28.

In addition to performing a speed control function, LSP control system 28 may be further configured to detect, sense, derive, or otherwise determine information relating to the terrain over which vehicle 10 is traveling (e.g., terrain type, surface type, terrain classification, terrain or surface roughness, etc.). In accordance with an embodiment, VCU 16 may be configured to perform this function and to do so in a number of ways. One such way is that described in UK Published Application No. GB2492748A published on 16 Jan. 2013, the entire contents of which are incorporated herein by reference. More particularly, in an embodiment, information relating to a variety of different parameters associated with the vehicle are received or acquired from a plurality of vehicle sensors and/or various vehicle subsystems, including, for example, some or all of those sensors 14 and/or subsystems 12 described above. The received information is then evaluated and used to determine one or more terrain indicators, which may represent the type of terrain and, in certain instances, one or more characteristics thereof, such as, for example, the classification, roughness, etc. of the terrain.

More specifically, in an embodiment, the speed control system (e.g., VCU 16) may include an evaluation means in the form of an estimator module to which the information acquired or received from one or more sensors 14 and/or subsystems 12 (collectively referred to as "sensor/subsystem outputs" below) is provided. Within a first stage of the estimator module, various ones of the sensor/subsystem outputs are used to derive a number of terrain indicators. In the first stage, vehicle speed is derived from wheel speed sensors, wheel acceleration is derived from wheel speed sensors, the longitudinal force on the wheels is derived from a vehicle longitudinal acceleration sensor, and the torque at which wheel slip occurs (if wheel slip occurs) is derived from a powertrain torque signal provided by the powertrain subsystem and additionally or alternatively from a torque signal provided by the driveline subsystem (e.g., transmission), and from motion sensors to detect yaw, pitch and roll. Other calculations performed within the first stage of the estimator module include the wheel inertia torque (the torque associated with accelerating or decelerating the rotating wheels), "continuity of progress" (the assessment of whether the vehicle is repeatedly starting and stopping, for example as may be the case when the vehicle is traveling over rocky terrain), aerodynamic drag, and lateral vehicle acceleration.

The estimator module also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel (based on the lateral acceleration and the output from a steering wheel sensor and/or steering column sensor), the wheel longitudinal slip (based on the longitudinal force on the wheels, the wheel acceleration, stability control system (SCS) activity and a signal indicative of whether wheel slip has occurred), lateral friction (calculated from the measured lateral acceleration and the yaw versus the predicted lateral acceleration and yaw), and corrugation detection (high frequency, low amplitude vertical wheel excitement indicative of a washboard type surface). The SCS activity signal is derived from several outputs from the ECU of a stability control system (SCS), which may contain a dynamic stability control (DSC) function, a terrain control (TC) function, anti-lock braking system (ABS), and hill descent control (HDC) algorithms, indicating DSC activity, TC activity, ABS activity, brake interventions on individual wheels, and powertrain torque reduction requests from the SCS ECU to the powertrain subsystem. All these indicate a slip event has occurred and the SCS ECU has taken action to control it. The estimator module also uses the outputs from wheel speed sensors and in a four wheel vehicle, compares outputs across each axle and from front to rear on each side, to determine a wheel speed variation and corrugation detection signal.

In an embodiment, and in addition to the estimator module, a road roughness module may also be included for calculating the terrain roughness based on air suspension sensors (the ride height or suspension articulation sensors) and wheel accelerometers. In such an embodiment, a terrain indicator signal in the form of a roughness output signal is output from the road roughness module.

In any event, the estimates for the wheel longitudinal slip and the lateral friction estimation are compared with one another within the estimator module as a plausibility check. Calculations for wheel speed variation and corrugation output, the surface rolling resistance estimation, the wheel longitudinal slip and the corrugation detection, together with the friction plausibility check, are then output from the estimator module and provide terrain indicator output signals, indicative of the nature of the terrain over which the vehicle is traveling, for further processing by VCU 16. For example, the terrain indicators may be used to determine which of a plurality of vehicle subsystem control modes (e.g., terrain modes) is most appropriate based on the indicators of the type of terrain over which the vehicle is traveling, and to then automatically control the appropriate subsystems 12 accordingly.

In another embodiment, rather than LSP control system 28 performing the above-described terrain sensing/detecting functionality, another component, module, or subsystem of vehicle 10, such as, for example VCU 16 (in the case where it does not perform the functionality of LSP control system 28), one of subsystems 12, or another suitable component may be appropriately configured to do so, and such other embodiments remain within the spirit and scope of the present invention.

It should be appreciated that the foregoing description of the arrangement, functionality, and capability of LSP control system 28 has been provided for purposes of example and illustration only and is not meant to be limiting in nature. Accordingly, LSP control system 28 is not intended to be limited to any particular embodiments or arrangements.

Again, the preceding description of vehicle 10 and the illustrations in FIGS. 1 and 2 are only intended to illustrate one potential vehicle arrangement and to do so in a general way. Any number of other vehicle arrangements and architectures, including those that differ significantly from the one shown in FIGS. 1 and 2, may be used instead.

Figure 4:
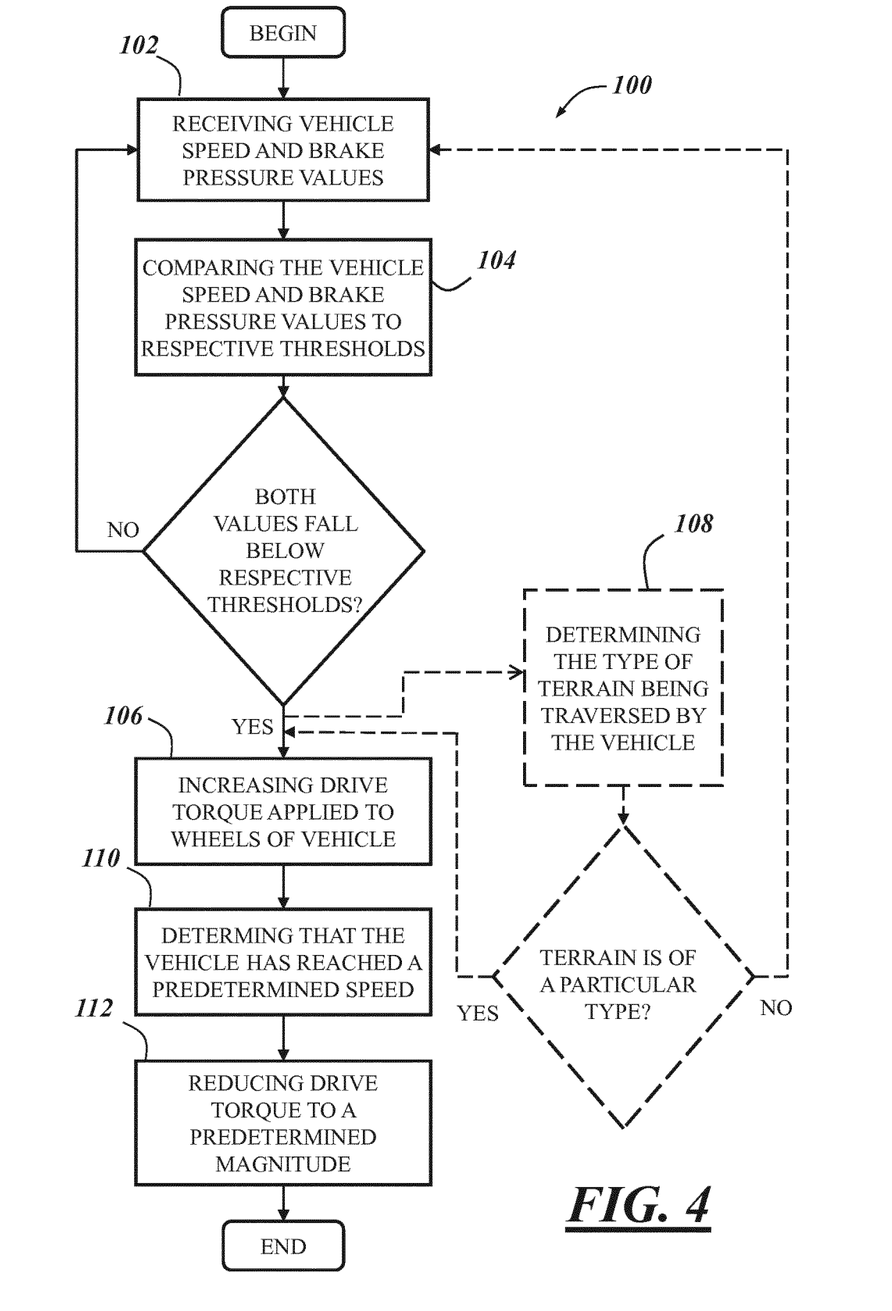
FIG. 4 is a flow diagram depicting various steps of an embodiment of a method of automatically controlling the deceleration of a vehicle to account for an increase in friction in the vehicle braking system as the vehicle decelerates.

Turning now to FIG. 4, there is shown an example of a method 100 of controlling the deceleration of a vehicle to account for an increase in friction in the vehicle brake system as the vehicle decelerates. For purposes of illustration and clarity, method 100 will be described in the context of vehicle 10 described above and illustrated in FIGS. 1 and 2, and brake subsystem 12$_2$ thereof in particular. It will be appreciated however, that the application of the present methodology is not meant to be limited solely to such an arrangement, but rather method 100 may find application with any number of arrangements (i.e., the steps of method 100 may be performed by subsystems or components of vehicle 10 other than those described below, or vehicle arrangements other than that described above). Additionally, it will be appreciated that unless otherwise noted, the performance of method 100 is not meant to be limited to any one particular order or sequence of steps or to any particular component(s) for performing the steps.

In an embodiment, method 100 comprises a step 102 of receiving one or more electrical signals indicative of a value of the speed of vehicle 10, and one or more electrical signals indicative of a brake pressure in the brake subsystem of vehicle 10. These signals may be received from a number of sources. For example, the signal(s) indicative of the speed value and/or the signal(s) indicative of the brake pressure value may be received from one or more appropriately configured sensors 14 of vehicle 10 (e.g., one or more vehicle speed sensors or wheel speed sensors—in the case of the vehicle speed, and one or more brake pressure sensors or brake pedal pressure sensors—in the case of the brake pressure). In another embodiment, the signal(s) indicative of the speed value and/or the signal(s) indicative of the brake pressure value may be received from one or more subsystems 12 of vehicle 10 (e.g., one or more of powertrain subsystem 12$_1$, brake subsystem 12$_2$, etc.). In either embodiment, the signals may be received directly from the corresponding sensor(s) and/or subsystems, or indirectly therefrom via, for example, a CAN bus, a SMBus, a proprietary communication link or in another suitable manner. Accordingly, it will be appreciated in view of the foregoing that the present invention is not intended to be limited to any one particular technique or source from which the vehicle speed and brake pressure values are received in step 102.

The above described functionality of step 102 may be performed by any suitable means, for example, an electronic processor that includes an electrical input for receiving electrical signals, including, for example, those described above. In an embodiment, the electronic processor may comprise and electronic processor of brake subsystem $12_2$ (e.g., ABS controller) or another suitable component of vehicle 10.

Following the receipt of the signals, or the values represented thereby, in step 102, method 100 may move to a step 104 of comparing each of the vehicle speed and brake pressure values to respective thresholds. These thresholds, which may be predetermined, empirically-derived thresholds that are preprogrammed into an appropriate component of vehicle 10, are indicative or representative of a particular vehicle speed and a particular brake pressure at which (or, in an embodiment, below which, in the instance of the vehicle speed value, and above which, in the instance of the brake pressure value) the brake pads of vehicle 10 may "grab" corresponding brake discs prior to vehicle 10 coming to a complete standstill, thereby resulting in vehicle coming to an abrupt stop. Each threshold may be dependent upon factors such as, for example, certain characteristics of the brake system components (e.g., sizes of the disc and pads of the braking devices, pad material, etc.). In one example or implementation, the speed threshold may be a value between 5-15 kph (approximately 3-9 mph), and the brake pressure threshold may 30 bar (approximately 435 psi) or 40 bar. It will be appreciated, however, that the present invention is not limited to such values; rather, any number of suitable threshold values may be utilized instead. The use of a threshold for brake pressure above which the system will not increase positive torque ensures that in a hard braking situation where it is clearly the intention of the driver to stop the vehicle quickly, no additional positive torque is applied to the wheels.

In one embodiment, both of the speed and brake pressure values may be compared to their corresponding thresholds simultaneously; while in another embodiment, they may be compared one at a time. In the latter instance, a first of the vehicle speed or brake pressure values may be compared to its corresponding threshold, and the second of the vehicle speed and brake pressure values may then be compared to its corresponding threshold only if the first falls below its corresponding threshold. Accordingly, in an embodiment, one of the values falling below its corresponding threshold is a condition precedent for comparing the other of the values to its corresponding threshold. For example, in an embodiment, step 104 may comprise first comparing the brake pressure value to its corresponding threshold. If the brake pressure value exceeds (or, in an embodiment, meets or exceeds) the brake pressure threshold, method 100 may revert back to step 102. If, however, the brake pressure value falls below (or, in an embodiment, meets or falls below) the brake pressure threshold, step 104 further comprises comparing the speed value to its corresponding threshold. In another example, step 104 comprises first comparing the speed value to its corresponding threshold. If the speed value exceeds (or, in an embodiment, meets or exceeds) the vehicle speed threshold, method 100 may revert back to step 102. If, however, the speed value falls below (or, in an embodiment, meets or falls below) the vehicle speed threshold, step 104 further comprises comparing the brake pressure value to its corresponding threshold.

The above described functionality of step 104 may be performed by any suitable means, for example, an electronic processor configured to access a memory device and execute the instructions stored therein such that it is operable to perform the required functionality. In an embodiment, the electronic processor may comprise an electronic processor of brake subsystem $12_2$ (e.g., ABS controller) or another suitable component of vehicle 10.

As illustrated in FIG. 4, when it is determined that both the vehicle speed value falls below (or, in an embodiment, meets or falls below) the threshold to which it was compared and the brake pressure value exceeds (or, in an embodiment, meets or exceeds) the threshold to which it was compared, method 100 may proceed to a step 106 of increasing (or commanding the increase of) the drive torque applied to one or more wheels of the vehicle (e.g., the idle speed of the engine/motor of powertrain subsystem $12_1$ may be increased) such that the increased torque acts against the braking of the vehicle, and therefore, the brake pressure in the brake subsystem $12_2$, as the vehicle is decelerated. As the drive torque is increased the brake discs slide past the brake pads with a greater turning moment so their resistance to being "grabbed" by the pads and being brought to a stop is increased.

Step 106 may be performed in any number of ways. For example, in one embodiment, the amount by which the drive torque is increased is dependent upon the particular values of one or both of the vehicle speed and brake pressure. In such an embodiment, the vehicle speed and/or brake pressure value(s) may be looked up in an empirically-derived data structure (e.g., look-up table) stored in or on a memory device that is part of or accessible by the particular component performing step 106 and that correlates vehicle speeds and/or brake pressures with drive torque increase magnitudes, and a drive torque increase magnitude may be acquired. One or more electrical signals may then be sent to, for example, powertrain subsystem $12_1$ to command an increase in drive torque equal to the magnitude acquired from the data structure. For purposes of illustration, assume that the vehicle speed is 5 kph (approximately 3 mph) and the brake pressure is 30 bar (approximately 435 psi), and that the actual vehicle speed value has fallen below the threshold to which it was compared in step 104 and the brake pressure value has exceeded the threshold to which it was compared in step 104. The 5 kph vehicle speed and 30 bar brake pressure may be looked up in a multi-dimensional look-up table and a drive torque increase magnitude may be acquired. One or more command signals may then be sent to powertrain subsystem $12_1$ to command an increase in drive torque in accordance with the acquired magnitude of drive torque increase.

In another embodiment, step 106 may comprise increasing, or commanding the increase of, the speed (e.g., idle speed) of the engine/motor of powertrain subsystem $12_1$ in accordance with a predetermined offset value, thereby necessarily increasing the drive torque being applied to the vehicle wheels. In such an embodiment, once it is determined in step 104 that both the actual vehicle speed has fallen below the threshold to which it was compared and the brake pressure value has exceeded the threshold to which it was compared, one or more electrical signals may be sent to powertrain subsystem $12_1$ to command the increase in engine/motor speed by an appropriate, predetermined amount. In an embodiment, the offset value used to increase the engine/motor speed may be stored in or on a memory device that is part of or accessible by the particular component performing step 106, and therefore, the command signal(s) may be indicative of the offset amount. In another embodiment, however, the offset value may be stored in or on a memory device that is part of or accessible by powertrain subsystem $12_1$, and therefore, the signal(s) sent to powertrain subsystem $12_1$ may simply serve as a command to increase the engine/motor speed and powertrain subsystem $12_1$ may then determine the magnitude of that increase.

In yet another embodiment, step 106 may comprise fixing the drive torque applied to the vehicle wheels by powertrain subsystem $12_1$ at a predetermined magnitude calculated or derived to match the brake pad/disc friction level versus vehicle speed and/or brake pressure. Accordingly, in an embodiment, once it is determined in step 104 that both the actual vehicle speed value has fallen below the threshold to which it was compared and the brake pressure value has exceeded the threshold to which it was compared, one or more electrical signals may be sent to powertrain subsystem $12_1$ to command that the drive torque be fixed at a particular magnitude. Similar to the embodiment described above, the particular magnitude at which the drive torque is to be fixed may be stored in or on a memory device that is part of or accessible by the particular component performing step 106, and therefore, the command signal(s) may be indicative of the magnitude of the fixed drive torque. In another embodiment, however, the magnitude may be stored in or on a memory device that is part of or accessible by powertrain subsystem $12_1$, and therefore, the signal(s) sent to powertrain subsystem $12_1$ may serve as a command to the powertrain subsystem $12_1$ to determine the appropriate torque magnitude and to fix the applied torque at that value.

In a further embodiment, step 106 may comprise increasing the drive torque to match the reduction in the vehicle speed. More particularly, as the vehicle speed decreases and the friction between the brake pads and brake discs increases, the drive torque can be increased to give the desired stop/braking response. In such an embodiment, the vehicle speed may be monitored and used in conjunction with a predetermined, empirically-derived speed/torque profile or curve to determine an amount by which to increase the drive torque as the vehicle speed changes. This profile or curve may be stored, for example, in or on a memory device that is part of or accessible by the particular component performing step 106. Accordingly, using a vehicle speed value and the profile, a torque magnitude for that speed may be determined and one or more electrical signals may be sent to powertrain subsystem $12_1$ to command an increase in drive torque equal to the magnitude acquired from the profile. To better illustrate, assume that the vehicle speed is 5 kph (approximately 3 mph) and that the actual vehicle speed fell below the threshold to which it was compared in step 104 and the brake pressure value exceeded the threshold to which it was compared in step 104. The 5 kph vehicle speed may be "looked up" in an appropriate profile and a magnitude of a drive torque increase may be acquired. One or more command signals may then be sent to powertrain subsystem $12_1$ to command an increase in drive torque in accordance with the acquired drive torque increase. In another embodiment, an open or closed-loop feedback control (PID) may be used instead. Accordingly, the present invention is not limited to any particular way(s) of increasing the drive torque to match the speed reduction.

In still a further embodiment, rather than matching the torque increase to the decrease in vehicle speed, as is done in the embodiment described immediately above, step 106 may comprise increasing the drive torque to match characteristics of the components of brake subsystem $12_2$, for example, the friction characteristics of the brake pads and disc.

This may comprise utilizing an empirically-derived model to determine a magnitude by which the drive torque should be increased. More particularly, friction characteristics of the brake subsystem $12_2$ may be modeled against one or more vehicle-related parameters or characteristics, including, for example and without limitation, brake pad and disc materials, brake pad and disc size, vehicle speed, brake pressure, and/or temperature increase. That or those parameter(s) may then be monitored and the values thereof used with the model, which may stored, for example, in or on a memory device that is part of or accessible by the particular component performing step 106, to match a drive torque increase using, for example, open-loop control techniques. One or more electrical signals may then be sent to powertrain subsystem $12_1$ to command that the drive torque be increased in accordance with the magnitude of the modeled torque increase. Accordingly, the command signal(s) may be indicative of the magnitude of the torque increase.

In yet still another embodiment, for example, in instances wherein vehicle 10 is a hybrid vehicle or a purely electric vehicle, one or more electric motors may be utilized to increase the drive torque applied to the wheels of vehicle 10, and may do so using techniques known in the art.

In any of the embodiments described above, step 106 may comprise increasing the drive torque applied to the wheels of vehicle 10 by an amount that is sufficient to allow vehicle 10 to decelerate in accordance with a requested deceleration (i.e., that commanded by a user of the vehicle via, for example, brake pedal 18 of vehicle 10, or by a component or system of vehicle 10, for example, LSP control system 28 or another suitable component). In an embodiment, step 106 may additionally or alternatively comprise increasing the drive torque applied by an amount sufficient to decelerate vehicle 10 in accordance with a predetermined or prescribed acceleration profile, an acceleration corridor (e.g., +/− (0.1 g-0.2 g), or both.

In any event, it will be appreciated in view of the foregoing that the present invention is not intended to be limited to any one particular technique for increasing, or commanding the increase of, the drive torque in step 106; rather, any suitable technique may be used. Additionally, the above described functionality of step 106 may be performed by any suitable means, for example, an electronic processor configured to access a memory device and execute the instructions stored therein such that it is operable to perform the required functionality. In an embodiment, the electronic processor may comprise an electronic processor of brake subsystem $12_2$ (e.g., ABS controller) or another suitable component of vehicle 10.

In addition to the steps described above, method 100 may further include one or more additional steps that may be used to determine whether one or more steps of method 100 should be performed. As illustrated in FIG. 4, one such step, step 108, comprises determining the type of terrain the vehicle is traversing and then determining whether the prevailing terrain is one deemed to be well-suited for the functionality of method 100. In an embodiment wherein method 100 includes step 108, method 100 may comprise performing one or more of the above-described steps (e.g., steps 102, 104, and/or 106) only if the terrain determined in step 108 is one of one or more particular types of terrain. Accordingly, in an embodiment, step 108 may comprise comparing the determined, prevailing terrain type with one or more particular terrain types stored in, for example, a data structure (e.g., look-up table). If the prevailing terrain type does, in fact, match one of the predetermined terrain types, then it may be determined in step 108 that method 100 may proceed to a subsequent step, for example, in the illustrated embodiment, step 106; otherwise, it may be determined that a subsequent step should not be performed, and method 100 may return to, for example, step 102. The functionality described herein may be particularly suited for any number of terrain types, and therefore, the predetermined terrain types to which the prevailing terrain type is compared may include any number of different terrain types. In an embodiment, these terrain types may include, for example, those having a deformable, low-mu surface (e.g., sand, mud, gravel, wet grass, etc.), as well as, or alternatively, those having a high-mu surface (e.g., pavement). Accordingly, it will be appreciated that the present invention is not limited to any particular terrain type(s).

In any event, determining the type of terrain may be performed in a number of ways. For example, in an embodiment, the terrain type may be determined automatically in the manner described in detail above with respect to LSP control system 28. For example, information relating to a variety of different parameters associated with the vehicle may be acquired from a plurality of vehicle sensors (e.g., sensors 14) and/or various vehicle subsystems (e.g., subsystems 12). The acquired information may then be evaluated and used to determine the terrain type. An additional or alternative way the terrain type may be determined is in response to a user input representative of a particular terrain type. A vehicle occupant may provide this input using a suitably configured user interface device, for example, a user interface device of the speed control system (e.g., one of user input devices 44 of LSP control system 28 described above), or another user interface device located within the vehicle cabin, for example, a knob, switch, pushbutton, touch screen display, or other suitable device that allows for the selection of a terrain type from one or a plurality of different terrain types. Accordingly, it will be appreciated that any number of techniques may be used to determine a terrain type, and therefore, the present invention is not intended to be limited to any particular technique(s) for doing so. In an instance wherein the terrain type is determined by a component or subsystem of vehicle 10 that is different than that configured to perform other steps of method 100, the determination may be communicated to that other component.

As briefly described above, once the prevailing terrain type is determined, step 108 may further include determining whether that terrain type is one of one or more terrain types for which it has been predetermined that the method 100 is well-suited. Accordingly, step 108 may further comprise comparing the prevailing terrain type with one or more predefined or predetermined terrain types stored in, for example, a data structure (e.g., look-up table). If the prevailing terrain type does, in fact, match one of the predetermined terrain types, then it may be determined in step 108 that method 100 may proceed to a subsequent step; otherwise, it may be determined that a subsequent step should not be performed, and method 100 may return to, for example, step 102.

In an embodiment, the functionality of step 108 described above may be performed by one or a combination of components/subsystems of vehicle 10, for example, a combination of LSP control system 28 and brake subsystem 12$_2$ (e.g., the electronic controller(s) thereof) or one or more other suitable component(s) of vehicle 10.

Whether or not method 100 includes optional step 108, and following the increase of drive torque in step 106, method 100 may include a step 110 of determining that vehicle 10 has reached (i.e., met or fallen below) a predetermined speed. In an embodiment, step 110 comprises determining that vehicle 10 has come to a stop or standstill; in other words, that vehicle 10 reached a speed of 0 kph (0 mph). In another embodiment, however, step 110 comprises determining that vehicle 10 come to a near standstill; in other words, that vehicle 10 has reached a certain speed greater than 0 kph (0 mph), for example and without limitation, a particular speed in the range of 0.5-2.0 kph (approximately 0.3-1.2 mph). In any event, step 110 may comprise monitoring one or more vehicle-related parameters and determining that vehicle 10 has reached the predetermined speed based thereon. More particularly, step 110 may comprise receiving one or more electrical signals indicative of a value of the speed of vehicle 10, which may be received from, for example, one or more appropriately configured sensors 14 of vehicle 10 (e.g., one or more vehicle speed sensors or wheel speed sensors) or from one or more subsystems 12 of vehicle 10 (e.g., powertrain subsystem 12$_1$). These signals may be received directly from the corresponding sensor(s) and/or subsystem(s), or indirectly therefrom via, for example, a CAN bus, a SMBus, a proprietary communication link or in another suitable manner.

In response to a determination in step 110 that vehicle 10 has, in fact, reached the predetermined speed, method 100 may further include a step 112 of reducing, or commanding a reduction in, the amount of drive torque applied to the wheels of vehicle 10 until the applied drive torque reaches a predetermined magnitude or level corresponding to, for example, an idle condition of the vehicle powertrain subsystem. In other words, once it is determined that vehicle 10 has reached the predetermined speed, the increased drive torque applied to the wheels of the vehicle is ramped out to a predetermined magnitude. In an embodiment, step 112 comprises sending one or more electrical signals to powertrain subsystem 12$_1$ to command the reduction in, or ramping out of, the applied drive torque. The rate at which the drive torque is reduced or ramped out in step 112 is dependent, at least in part, on the characteristics or capability of the engine or motor of powertrain subsystem 12$_1$, and may be as fast or as slow as the engine/motor can manage or tolerate. Accordingly, the present invention is not limited to any particular reduction/ramp-out rate.

The above described functionality of steps 110 and 112 may be performed by any suitable means, for example, an electronic processor that includes an electrical input for receiving electrical signals, including, for example, those described above. In an embodiment, the electronic processor may comprise an electronic process of brake subsystem 12$_2$ (e.g., ABS controller) or another suitable component of vehicle 10.

It will be appreciated in view of the above that a benefit or advantage of the present invention, among potentially others, is that in an instance wherein a vehicle traversing, for example, a deformable, low-mu surface (e.g., sand, gravel, wet grass, or mud) is being decelerated but has not yet come to a stop, the braking of the vehicle (e.g., brake pressure and/or brake torque) acts against the increased drive torque (over vice versa). This prevents, or at least limits, the buildup of surface material in front of the wheels as a result of an increase in friction in the braking system as the vehicle comes to a stop, and therefore, makes it easier for the vehicle to subsequently pull away. Similarly, in an instance wherein a vehicle traversing a solid, high-mu surface, for example, a paved road, is decelerated but has not yet come to a stop, a more consistent level of braking may be achieved, which may give the occupants of the vehicle a reliable, chauffeur stop level of comfort that is independent of the driver's particular braking style.

It will be understood that the embodiments described above are given by way of example only and are not intended to limit the invention, the scope of which is defined in the appended claims. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Further, the terms "electrically connected" or "electrically coupled" and the variations thereof are intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A method of controlling the deceleration of a vehicle to account for an increase in friction in the vehicle brake system as the vehicle decelerates, comprising:
    receiving a signal indicative of a value of the speed of the vehicle and a signal indicative of a value of a brake pressure in the vehicle brake system;
    comparing the vehicle speed value and the brake pressure value to respective thresholds; and
    when the vehicle speed value falls below the threshold to which it was compared and the brake pressure value exceeds the threshold to which it was compared, increasing the drive torque applied to one or more wheels of the vehicle such that the increased drive torque acts against the braking of the vehicle as the vehicle is decelerated to a stop.

2. The method of claim 1 further comprising:
    determining that the vehicle has reached a predetermined speed; and
    in response to a determination that the vehicle has reached the predetermined speed, reducing the amount of drive torque applied to the one or more wheels of the vehicle.

3. The method of claim 1, wherein the comparing step comprises comparing a first of the vehicle speed value or brake pressure value to the corresponding threshold, and then comparing the other of the vehicle speed value or brake pressure value to the corresponding threshold only when the first of the vehicle speed value or brake pressure value falls below, in the instance of the vehicle speed value, or exceeds, in the instance of the brake pressure value, the corresponding threshold.

4. The method of claim 1, further comprising:
    determining the type of terrain the vehicle is traversing; and
    increasing the drive torque applied to one or more wheels of the vehicle only when the terrain is one of one or more particular terrain types.

5. The method of claim 4, wherein determining the terrain type comprises receiving a user input indicative of a terrain type or automatically determining the terrain type.

6. The method of claim 4, wherein the one or more particular terrain types correspond to terrains having a deformable surface.

7. The method claim 4, wherein the one or more particular terrain types comprises at least one of sand, gravel, mud, or grass.

8. The method of claim 1, wherein the increasing step comprises increasing the drive torque by an amount sufficient to allow the vehicle to decelerate in accordance with a requested deceleration.

9. A non-transitory, computer-readable storage medium storing instructions thereon that when executed by one or more electronic processors causes the one or more electronic processors to carry out the method of claim 1.

10. A system for controlling the deceleration of a vehicle to account for an increase in friction in the vehicle brake system as the vehicle decelerates, the system comprising:
    means for receiving a signal indicative of a value of the speed of the vehicle and a signal indicative of a value of a brake pressure in the vehicle brake system; and
    means to compare automatically the vehicle speed value and brake pressure value to respective thresholds, and when the vehicle speed value falls below the threshold to which it was compared and the brake pressure value exceeds the threshold to which it was compared, command the increase in the drive torque applied to one or more wheels of the vehicle such that the increased drive torque acts against the braking of the vehicle as the vehicle is decelerated to a stop.

11. The system of claim 10, wherein the receiving means and comparing means comprise:
    an electronic processor having an electrical input for receiving the signals indicative of the vehicle speed and brake pressure values; and
    an electronic memory device electrically coupled to the electronic processor and having instructions stored therein,
    wherein the processor is configured to access the memory device and execute the instructions stored therein such that it is operable to:
        compare the vehicle speed value and brake pressure value to respective thresholds; and
        when the vehicle speed value falls below the threshold to which it was compared and the brake pressure value exceeds the threshold to which it was compared, command the increase in the drive torque applied to one or more wheels of the vehicle such that the increased drive torque acts against the braking of the vehicle as the vehicle is decelerated to a stop.

12. The system of claim 11, wherein the processor is further configured to access the memory device and execute the instructions stored therein such that it is operable to:
    determine that the vehicle has reached a predetermined speed; and
    in response to the determination that the vehicle has reached the predetermined speed, command the reduction of the amount of drive torque applied to the one or more wheels of the vehicle.

13. The system of claim 11, wherein the processor is operable to compare a first of the vehicle speed value or brake pressure value to the corresponding threshold, and to then compare the other of the vehicle speed value or brake pressure value to the corresponding threshold only when the first of the vehicle speed value or brake pressure value falls below, in the instance of the vehicle speed value, or exceeds, in the instance of the brake pressure value, the corresponding threshold.

14. The system of claim 11, wherein the processor is further operable to:
   determine the type of terrain the vehicle is traversing; and
   command an increase in the drive torque applied to one or more wheels of the vehicle only when the terrain is one of one or more particular terrain types.

15. The system of claim 14, wherein the processor is operable to receive a user input indicative of a terrain type, and to determine the terrain type based on that user input or to automatically determine the terrain type.

16. The system of claim 14, wherein the one or more particular terrain types correspond to terrains having a deformable surface.

17. The system of claim 14, wherein the one or more particular terrain types comprises at least one of sand, gravel, mud, or grass.

18. A vehicle comprising the system according to claim 10.

19. An electronic controller for a vehicle having a storage medium associated therewith storing instructions that when executed by the controller causes the control of the deceleration of the vehicle in accordance with the method of:
   receiving a signal indicative of a value of the speed of the vehicle and a signal indicative of a value of a brake pressure in the vehicle brake system;
   comparing the vehicle speed value and the brake pressure value to respective thresholds; and
   when the vehicle speed value falls below the threshold to which it was compared and the brake pressure value exceeds the threshold to which it was compared, increasing the drive torque applied to one or more wheels of the vehicle such that the increased drive torque acts against the braking of the vehicle as the vehicle is decelerated to a stop.

20. The electronic controller of claim 19 wherein said instructions when executed by the controller further causes the controller to;
   determine that the vehicle has reached a predetermined speed; and
   in response to a determination that the vehicle has reached the predetermined speed, reduce the amount of drive torque applied to the one or more wheels of the vehicle.

* * * * *